United States Patent
Ichikawa et al.

(10) Patent No.: US 6,656,298 B2
(45) Date of Patent: Dec. 2, 2003

(54) THIN-WALLED HONEYCOMB STRUCTURE AND METHOD FOR REINFORCING THE SAME

(75) Inventors: Yukihito Ichikawa, Nagoya (JP); Koichi Ikeshima, Okazaki (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/953,954

(22) Filed: Sep. 18, 2001

(65) Prior Publication Data

US 2002/0022109 A1 Feb. 21, 2002

Related U.S. Application Data

(63) Continuation of application No. 09/318,265, filed on May 25, 1999, now Pat. No. 6,352,756.

(30) Foreign Application Priority Data

Jun. 18, 1998 (JP) ............................................. 10-171108

(51) Int. Cl.[7] ................................................. B05D 5/00
(52) U.S. Cl. ..................... 156/89.22; 156/242; 427/226; 427/230; 427/244; 427/284; 427/287; 427/154; 427/443.2
(58) Field of Search ................................. 427/226, 230, 427/287, 243, 244, 256, 284, 430.1, 443.2, 154; 428/116, 34.4, 35.7, 174, 178, 188; 264/129, 232, 340; 156/60, 89.11, 89.22, 242

(56) References Cited

U.S. PATENT DOCUMENTS

| | | | |
|---|---|---|---|
| 4,233,351 A | 11/1980 | Okumura et al. | 428/116 |
| 4,455,336 A | 6/1984 | Ogawa et al. | 428/116 |
| 4,532,228 A | 7/1985 | Golino et al. | 502/261 |
| 5,139,993 A | 8/1992 | Schmidt et al. | 502/325 |
| 5,433,904 A | 7/1995 | Noky | 264/40.1 |
| 5,750,026 A | 5/1998 | Gadkaree et al. | 210/502.1 |
| 5,851,326 A | 12/1998 | Custer et al. | 156/89.22 |
| 5,876,831 A | 3/1999 | Rawal | 428/117 |
| 6,352,756 B1 * | 3/2002 | Ichikawa et al. | |

FOREIGN PATENT DOCUMENTS

| | | |
|---|---|---|
| EP | 0 807 466 | 11/1997 |
| JP | 50-77291 | 6/1975 |
| JP | 51-87482 | 7/1976 |
| JP | 53-133860 | 3/1978 |
| JP | 53-34373 | 8/1978 |
| JP | 54-150406 | 11/1979 |
| JP | 55-147154 | 11/1980 |
| JP | 56-129042 | 10/1981 |
| JP | 56-129043 | 10/1981 |
| JP | 56-133036 | 10/1981 |
| JP | 58-024228 | 2/1983 |
| JP | 59-082320 | 4/1984 |
| JP | 61-229100 | 9/1986 |
| JP | 62-18797 | 4/1987 |
| JP | 63-144836 | 9/1988 |

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A thin-walled honeycomb structure includes: a circumferential wall, numerous partition walls disposed inside the circumferential wall, and numerous cell passages defined by the partition walls. A circumferential portion of the honeycomb structure is reinforced wholly or in a part within a certain distance from an extremity surface of the honeycomb structure by a reinforcing material that dissipates or evaporates at a high temperature, and a method for producing the same.

6 Claims, 3 Drawing Sheets

THIN-WALLED HONEYCOMB STRUCTURE AND METHOD FOR REINFORCING THE SAME

This is a continuation of application Ser. No. 09/318,265 filed May 25, 1999, now U.S. Pat. No. 6,352,756, granted Mar. 5, 2002.

BACKGROUND OF THE INVENTION AND RELATED ART STATEMENT

The present invention relates to a honeycomb structure for use as a catalyst carrier for purifying automobile exhaust gas. More particularly, the present invention relates to a thin-walled honeycomb structure that has thin partition walls, a light weight, a small loss of pressure, and an improved mechanical strength. All improvements by virtue of reinforcing a circumferential portion of the honeycomb structure. Thereby preventing damage to the honeycomb structure during its manufacturing or its handling. The invention relates to a method for reinforcing such a thin-walled honeycomb structure.

There has conventionally used, as a carrier for catalysts of automobile exhaust gas(hereinafter referred to as a catalyst for purifying exhaust gas), a ceramic honeycomb structure having (a) numerous cell passages defined by a plurality of partition walls and (b) a circumferential wall surrounding the cell passages(hereinafter referred to as a honeycomb structure). That is, the conventionally used exhaust gas catalysts have been produced by coating a honeycomb structure with a γ-alumina to form a layer thereof, and loading a catalytic component such as a noble metal or the like into inner surfaces of pores of thus formed γ-alumina layer.

More concretely, a honeycomb structure has usually been produced by the steps of extrusion-molding a material, which mainly becomes cordierite when it is fired, through a nozzle having lattice-like slits so as to form integratedly a honeycomb portion and a circumferential wall, and subsequently drying and firing thus molded article. Thus obtained honeycomb structure is transferred to a step of forming the catalytic layer by first coating the inner surfaces of numerous cell passages with γ-alumina so as to form a γ-alumina layer thereon, and then loading a noble metal component, as a catalytic component, such as platinum, rhodium, or palladium into inner surfaces of pores of thus formed γ-alumina layer. Then, the honeycomb structure is subjected to baking treatment at a temperature of about 600° C. so as to back the catalytic component thereon to give a catalyst for purifying exhaust gas. Thus produced catalyst for purifying exhaust gas is housed in a metallic container with aid of a cushioning material. The metallic container, i.e., a converter is connected to an exhaust pipe by means of welding, bolting, or the like, to set up an engine for an automobile, etc.

Regulations on exhaust gases have become stricter year by year, especially in developed countries, due to environmental problems. To cope with these stricter regulations, an ever-lasting improvement in purification ability is required for a catalyst for purifying exhaust gas. On the other hand, a desire to lower fuel charge and increase output of power has been evident in the fields engine development. Because of such a situation, the reduction in pressure loss during operation has been required in the case of the catalyst for purifying exhaust gas. In the case of the catalyst for purifying exhaust gas, so as to solve problems mentioned above, there has become evident such a strong movement that the improvement in the performance of the catalyst for purifying exhaust gas at the time of warming up of the engine has been tried by increasing a passage area of the cell passages so as to reduce pressure loss. Furthermore, lightening the weight of the catalyst for purifying exhaust gas itself so as to reduce its heat capacity by making the partition walls thin without decreasing the number of cells as well. Hitherto, a honeycomb structure having partition walls of 0.15 mm or more in the thickness was most popular. However, a honeycomb structure having partition walls having of 0.13 or less, particularly, 0.11 mm or less in the thickness has recently come to be popular.

However, to make partition walls of a honeycomb structure thinner causes a problem that the extremities (hereinafter sometimes referred to as a corner) of circumferential portions of the honeycomb structure are often broken during manufacturing, handling, or conveying the honeycomb structure, or holding the honeycomb structure into the container for converter so as to set it in an engine because the structural strength of the honeycomb structure is consequently decreased, particularly in the circumferential portions of the honey-comb structure. This phenomenon becomes evident when the partition walls of the honeycomb structure becomes thinner. This is because damage occurs in a honeycomb structure more frequently when partition walls in a honeycomb structure are thinned. Note that the honeycomb structure is liable to break when an external force such as a mechanical shock is applied thereto during transportation or the like, even in the case of the honeycomb structure having thicker partition walls. This is because a ceramic material is inherently brittle. Thus, the breaking of the honeycomb structure was also occasionally reported. Because of its very low frequency, however, it has not particularly been regarded as a problem.

Further, the frequency of the deformation in partition walls during extrusion-molding has remarkably increased as partition walls become thinner; while in the case of the conventional honeycomb structures having such thicker partition walls as the thickness of 0.15 mm or more, such a problem is no so serious. This is because the circumferential wall has a thickness of at least 0.3 mm, and therefore, the strength in the circumferential portion can be ensured to a certain degree. The deformation in partition walls tends occurs mainly at the vicinity of the circumferential walls in the circumferential portions. This is due to the failure to attain uniform extrusion-molding because of the unbalance in the fluidity of raw material between the honeycomb portions and the vicinity of the circumferential partition walls, when the circumferential walls are thicker than partition walls. Such thickening ensures strength in the circumferential portion.

A similar phenomenon when using cordierite to deform the partition walls is also observed when a ceramic material such as alumina, mullite, silicon nitride, silicon carbide, or zirconia is subjected to an extrusion-molding. This is because, as a starting material, a material prepared by mixing and kneading said material with water and a binder is used as well. Since the deformation in partition walls is mainly attributed to buckling derived from compressive load, a similar problem is also observed in not only a honeycomb structure having square cells, but also a honeycomb structure having rectangular, triangular, or hexagonal shape.

Some proposals have been made to solve the various problems derived by making partition walls thinner in a honeycomb structure. First, it has been proposed to thin the circumferential walls from 0.3 mm to 0.1 mm. Thus the thickness of the circumferential walls approximates the thickness of the partition walls, thereby improving the balance in the flow amount of raw material during molding. In this case, however, the strength of the circumferential wall is not sufficient. In other words, when circumferential walls are too thin, breaking starts at the circumferential walls due to insufficient rigidity. A circumferential wall thickness of at least 0.1 mm, desirably at least 0.15 mm, is sufficient just to house the honeycomb structure in a container kept under a uniform and static external pressure. However, such a circumferential wall thickness is not sufficient to resist external pressure, such as mechanical shock during transport or the like.

On the other hand, there has been made such a proposal that the strength against mounting pressure of the circumferential walls would increase if the thickness of the circumferential walls is thickened. Thus, a cordierite honeycomb structure having square cells, a partition wall thickness of 0.11 mm, and a circumferential wall thickness of at least 0.4 mm was prepared so as to increase strength. Contrary to expectation, however, it was found, as a result of an isostatic strength test, that the honeycomb structure was not improved in strength and had a tendency of deterioration in strength. The investigation was made so as to clarify the reason why the isostatic strength could not improve when only the thickness of the circumferential walls was made thicker. As a result, it has been found that partition walls (ribs) around cells in the circumference in a molded article are deformed to great extent just after extrusion-molding, and that the number of deformed partition walls increases as the circumferential wall is made thicker.

If the circumferential wall is thickened, the amount of raw material passing through slits for forming the circumferential walls increases when the raw material passes through slits of the nozzle upon extrusion-molding. As a consequence, partition walls around circumferential cells are pulled toward the circumferential walls, or the circumferential walls press the internal partition walls of the honeycomb structure. Thus, it has been evident that the remarkable gap in the unbalance between a flow of the raw material for the circumference wall and a flow of the raw material for the partition walls is considered to be a major cause. Further, the thinning of the partition walls brings buckling deformation more easily. In addition, the circumferential wall and partition walls in the circumferential portion are deformed by the weight of the honeycomb structure itself at the time when a honeycomb structure is supported by a jig on the surface of the circumferential walls right after extrusion-molding. These are also considered to be the main causes.

If the internal partition walls of the honeycomb structure is molded straight, the breakage of the honeycomb structure starts owing to the compression of the partition walls when pressure is given to the honeycomb structure from the surface side of the circumferential wall. This in because the internal portion of the honeycomb structure is theoretically the center of compressive stress. However, in the case where partition walls at the vicinity of the circumferential portion are deformed, or when the circumferential wall is extremely thin, bending stress, i.e., a tensile stress is generated at the position of partition walls of the honeycomb structure. Since the ratio of tensile strength to compressive strength is generally as low as about 1:10, the honeycomb structure starts to break if it has deformed partition walls when even only very lower strength is given thereto.

On the other hand, even if the circumferential wall can be considerably thickened at the time of molding, a great difference in heat capacity exists between the honeycomb portion having thin partition walls and the thick circumferential wall, thereby lowering thermal shock resistance of the honeycomb heater.

In order to solve the problems derived from an extreme difference in thickness between the honeycomb portion and the circumferential portion, there has been made the following proposal; a molding is carried out, with the adjustment of a raw material flow at the time of extrusion, by making partition walls in the circumferential portion and the circumferential wall thicker so as to enhance pressure resistance in an axial direction of the honeycomb structure and a molding is carried out by adjusting. However, since the adjustment of balance is very subtle when this means is used, it becomes more difficult to suppress deformation in the partition walls as the circumferential wall becomes thicker. Furthermore, the thicker circumferential portion gives a greater influence on its own heat capacity. In this case, the temperature difference between the inside and the outside of the circumferential wall increase; thereby thermal shock resistance of the honeycomb structure inevitably decreases. Furthermore, since such means brings about an increase in weight of the honeycomb structure, the performance of the catalyst after of an engine is warmed up is lowered. Furthermore, it is not so preferable due to the pressure loss problem.

Thus, numerous studies have conventionally been made so as to solve the various problems caused in accordance with thinning of partition walls in a honeycomb structure. However, the problems have not been solved yet. Under such conditions, the present inventor paid attention to reinforcement of the circumferential portion, particularly its edge portion, in the honeycomb structure.

There has been known a method of reinforcing a honeycomb structure. In the method, a coat layer is formed by applying a ceramic material as a reinforcing material for reinforcement of the circumferential portion on the circumferential wall without unitarily forming the thick circumferential wall by extrusion molding, or filling the reinforcing material into cells in the circumferential portion. However, this method has drawbacks such as, for example, the reduction in the thermal shock resistance of the honeycomb structure during the practical use, the occurrence of the detachment in the coat layer due to cracks generated in the coat layer, the formation of the cracks that sometimes reaches to the honeycomb structure due to the shrinkage of the coat layer itself caused by a high temperature generated during engine operation, and the like.

There has been known another method, in which a resin is coated on the surface of the circumferential portion. The aim of this method is to prevent loading of catalyst on the surface of the circumferential wall, and therefore, a water-repellent resin film is formed on the surface of the circumferential wall by using a resin material having low strength such as vinyl acetate, fluororesins, or silicone resins. Thus, in the method it is not intended to reinforce the circumferential portion of the honeycomb structure. Therefore, the film formed is thin since this film is formed not so as to reinforce the circumferential portion. In fact, the thin film does play any active role in the reinforcement of the circumferential portion.

SUMMARY OF THE INVENTION

The present invention has been made, taking into consideration the aforementioned conventional problems. Thus, the aim of the present invention is to provide a honeycomb structure having not only sufficient catalytic properties, mechanical strength, and thermal shock resistance, but also having reinforced circumferential portion not so as to be damaged during manufacturing or handling the honeycomb structure. According to the present invention, there is provided a thin-walled honeycomb structure comprising:

a circumferential wall, numerous partition walls disposed inside the circumferential wall cage portions, defined by the partition walls meeting the circumferential wall, and numerous cell passages defined by the partition walls and a coat of reinforcing material covering the circumferential wall;

wherein a circumferential portion of the honeycomb structure is reinforced wholly or in a part within a certain distance from an extremity surface of the honeycomb structure by a reinforcing material that dissipates, or evaporates at a high temperature thereby protecting the edge portions of the honeycomb structure from damage before the structure is fired.

In a thin-walled honeycomb structure of the present invention, an organic high molecular material having high strength or high elasticity is preferably used as a reinforcing material. Each of the partition walls of the honeycomb structure has a thickness of 0.13 mm or less. A cross section of a cell passage preferably has a triangular, square, rectangular, hexagonal, or circular shape. As a material for the honeycomb structure, there can be preferably used at least one kind of porous ceramic material selected from a group consisting of cordierite, alumina, mullite, silicon nitride, silicon carbide, and zirconia.

According to the present invention, there is further provided a method for reinforcing a thin-walled honeycomb structure comprising:

presenting a honeycomb structure having a circumferential wall, numerous partition walls disposed inside the circumferential wall, and numerous cell passages defined by the partition walls;

wherein a circumferential portion of the honeycomb structure is coated wholly or in a part within a certain distance from an extremity surface of the honeycomb structure with an organic high molecular material.

Preferably, this method for reinforcing a thin-walled honeycomb structure, comprises the steps of:

impregnating and/or coating a circumferential portion of the honeycomb structure with an organic high molecular material wholly or in a part within a certain distance from an extremity of the surface of the honeycomb structure, and curing the organic high molecular material.

Also this method can preferably comprise the steps of:

pouring an organic high molecular material into cell passages at least located at the vicinity of a circumferential portion inclusive of a foremost outer circumferential portion of the honeycomb structure so as to coat or fulfil inner surfaces of said cell passages with said material, and curing the material.

It is also preferable that a circumferential portion of the honeycomb structure is wrapped up wholly or in a part within a certain distance from an extremity surface of the honeycomb structure with a tape formed by molding an organic high molecular material. The tape is preferably a pressure-sensitive adhesive, and the organic high molecular material is a photo-curable photo-reactive material. At least the circumferential portion of the end surface of the honeycomb structure is preferably reinforced with an organic high molecular material after injection molding, or after drying before firing but after injection molding, thereby the productivity is improved.

DETAILED DESCRIPTION OF THE INVENTION

A thin-walled honeycomb structure of the present invention has the same structure and basic shape as a conventionally known general honeycomb structure 1. As shown in a perspective view of FIG. 1, the thin-walled honeycomb structure is constituted by a circumferential wall 2, numerous partition walls 3 disposed inside the circumferential wall 2, and numerous cell passages 4 (cells 4) defined by the partition walls 3. Though each of the cells 4 has a square shape (sectional shape) in FIG. 1, it may also be triangular, rectangular, hexagonal, circular, or the like.

Figure 1:
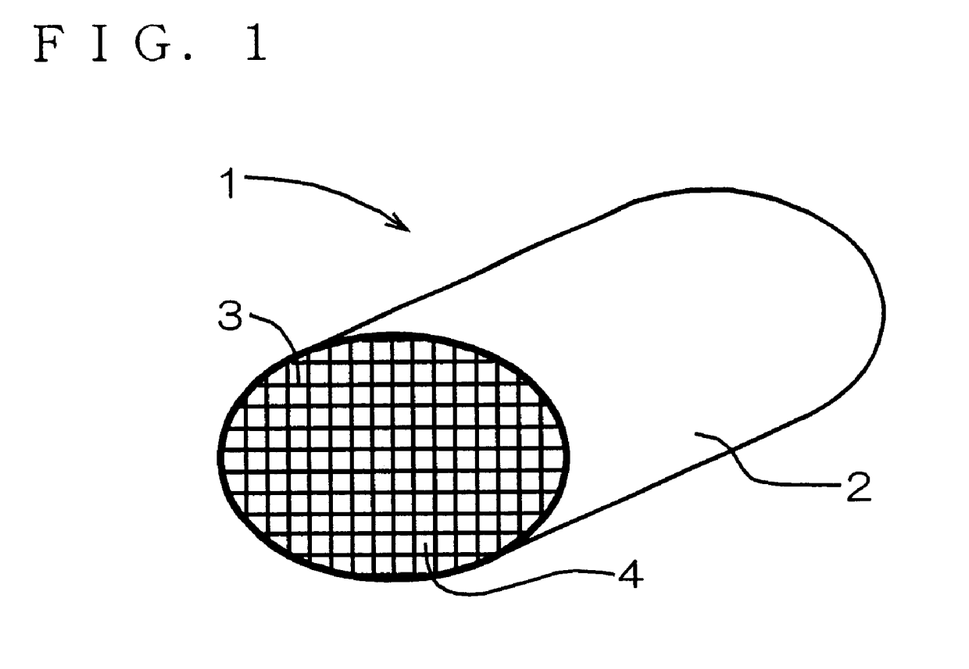
FIG. 1 is a perspective view showing an unreinforced thin-walled honeycomb structure.

As a material forming a thin-walled honeycomb structure 1, there is preferably used at least one porous ceramic material selected from the group consisting of cordierite, alumina, mullite, silicon nitride, silicon carbide, and zirconia. Extrusion molding is preferably employed for the molding. A honeycomb heater having almost uniform thickness wholly including the circumferential portion has an advantage of being molded easily and improvement in a compressive rupture strength. The circumferential wall 2 is preferably thin in view of thermal shock resistance. However, the circumferential wall 2 of the thin-walled honeycomb structure 1 is required to have a structural strength sufficient to resist to mounting pressure to be kept in a converter container. For this reason, it is known from experience as an artisan in the technical field of this invention or analysis of FEM value that the circumferential wall 2 preferably has a thickness of at least 0.1 mm, preferably 0.2 mm or more.

An improvement in strength pressure resistance of the thin-walled honeycomb structure 1 in the converter container is derived from the formation of the catalytic layer in the thin-walled honeycomb structure 1. That is, during the time when the catalytic layer is formed, $\gamma$-alumina is coated on surfaces of partition walls 3 in the thin-walled honeycomb structure 1, thereby structural strength of the thin-walled honeycomb 1 is improved. Therefore, as far as the reinforcement of the circumferential portion of the thin-walled honeycomb structure 1 is retained during the period from the step of molding to the step of housing the honeycomb structure 1 in the converter container, the thin-walled honeycomb structure 1 may not be damaged. Needless to say, the thin-walled honeycomb structure 1 is required not to show any inconvenience such as damaging under operational conditions after the honeycomb structure 1 is housed in the converter container. From such a viewpoint, the thickness of the partition walls 3 is 0.13 mm or less in the case of the thin-walled honeycomb structure 1 according to the present invention.

From the above viewpoint, in the case of the thin-walled honeycomb structure according to the present invention, the circumferential portion (external surface of the circumferential wall 2) of the honeycomb structure is reinforced wholly or in a part within a certain distance from an extremity of the surface of the honeycomb structure (i.e., an edge portion) by a reinforcing material such as an organic high molecular material(hereinafter sometimes referred to as "resin") may dissipate, or evaporate at a high temperature. That is, unlike any conventional method, the circumferential portion is reinforced not with a material such as ceramic having thermal resistance, but with a resin having high strength and high elasticity, particularly a resin which dissipates or evaporates at a high temperature, for example, which may dissipate or evaporate at a relatively low temperature of 300° C. or less. The term dissipates or evaporates means hereinafter an action required for removing a resin used for reinforced according to the present invention by running off a melted resin after melting it at a high temperature, decomposing a resin at a high temperature, by gasifying it at a high temperature, or the like. That is, any action may be included in the above-mentioned term, as far as a resin used for reinforced according to the present invention can be removed thereby, without giving any adverse effect on the molded article according to the present invention.

The circumferential portion is reinforced with an elastic layer from the molding step of the thin-walled honeycomb structure to the formation step of catalytic layer. On the other hand, since a coat layer of such a resin in the circumferential portion evaporates during a treatment at a high temperature over 500° C., the coat layer is not present during using a catalytic converter and does not give any adverse affect on the performance of the converter.

Since a resin is an adhesive, an elastomer, a rubber, or the like, a liquid resin is cured to exhibit an adequate strength and to absorb an impact because of its elasticity. Further, a resin is cheap and is easily obtainable because it has widely used. Furthermore, the application of a resin on the honeycomb structure may be easy, and in various manners. Therefore, a resin is suitable in the aspects of mass productivity and cost.

The following method can be given, as an exemplary method for reinforcing the circumferential portion of the thin-walled honeycomb structure: a method which comprises impregnating the thin-walled honeycomb structure with a resin in an entire surface of the circumferential wall or in an extremity portion, and/or coating a resin the surface of the circumferential wall with a resin, and then curing thus coated resin. That is, the resin permeates from the surface into the inside of the circumferential walls to reinforce the circumferential wall itself and the surface of the circumferential wall. Examples of resins include various kinds of adhesives such as thermosetting resins such as epoxy resins, elastic resins such as silicone resins, and ultraviolet curing resins such as acrylic resins; elastomers such as silicone; rubber materials; and pressure-sensitive adhesives.

Since a thermosetting adhesive has a high adhesive strength and a high shear strength, impregnating the circumferential portion with a thermosetting adhesive with the utilization of capillary phenomenon, and then curing the thermosetting adhesive can improve the strength of the circumferential portion. When a thermosetting resin is used, as an adhesive layer, so as to protect the surface of the circumferential portion of the honeycomb structure by coating the surface with the resin, an additive may be added to the thermosetting resin to improve its shock resistance. Such an additive may include a thermoplastic resin such as nylon; a rubber material such as a nitrile rubber and a silicone rubber, an elastic elastomer; or a fiber material such as glass fibers, cellulose, or the like. This is because thermoplastic resins generally have a low shock resistance.

It is possible to use an elastic elastomer adhesive alone. A liquid prepared by mixing a curing agent with a resin can be coated on the entire surface of the circumferential wall of the thin-walled honeycomb structure in various methods such as spraying, brushing, and printing In the case of trying to improve productivity by shortening a time of curing of the resin, an ultraviolet curing type resin such as an acrylate or an epoxy resin may be used. In this case, it is preferable to improve shock resistance by mixing an elastic elastomer or the like with the ultraviolet curing resin. By coating the surface of the circumferential portion, the effect of not to load a catalyst on the surface of the circumferential portion can be expectable as in conventional techniques.

As an additional preferable method for reinforcing the circumferential portion of the thin-walled honeycomb structure, there is given a method comprising the step of coating surfaces of the cell passages by putting a resin in the cell passages in the periphery of the circumferential portion including at least cells in the outermost circumferential portion of the thin-walled honeycomb structure, or by filling a resin into the cell passages, and curing the resin. In this case, a resin used in the aforementioned method of reinforcement can be used.

As a method which does not need a curing treatment such as heating, irradiation of light, or the like, the entire surface or the edge portion of the circumferential portion of the honeycomb structure is wrapped up with a tape formed by molding an organic high molecular material. In this case, a pressure-sensitive adhesive in which a plasticizer, or a filler is mixed with a rubber material using an adhesive property can be used. A tape-like adhesive can be easily coated on the surface of the circumferential wall of the thin-walled honeycomb structure by winding the tape round the surface. Further, the tape may be easily peeled.

As described above, the circumferential portion of the fired thin-walled honeycomb structure is reinforced usually. When a molded body or dried body of the thin-walled honeycomb structure is conveyed to a distant place before being fired, the circumferential portion of the thin-walled honeycomb structure is liable to be damaged during transportation. Therefore, it is preferable that at least the edge portion of the thin-walled honeycomb structure is reinforced with the aforementioned various resins after extrusion molding or drying after extrusion molding and before firing. Of course, the entire surface of the circumferential wall may be reinforced. Thus, production efficiency can be improved.

The present invention is hereinafter described in more detail by means of examples. However, the present invention is by no means limited to the examples.

EXAMPLES

Generally, a honeycomb structure (carrier) for purifying exhaust gas is required for isostatic strength and thermal shock resistance as an index durable under for practical conditions for use as a structural body besides the performances as to loading ability of a catalyst and lowness in pressure loss. Isostatic strength is prescribed as an index of external pressure resistance in automobile standards (JASO standards) M505-87 issued by Shadan Hojin Jidousha Gijutukai (Association of Automobile Technology). However, any index of external pressure resistance during handling or transportation is not particularly prescribed in it.

Figure 2:
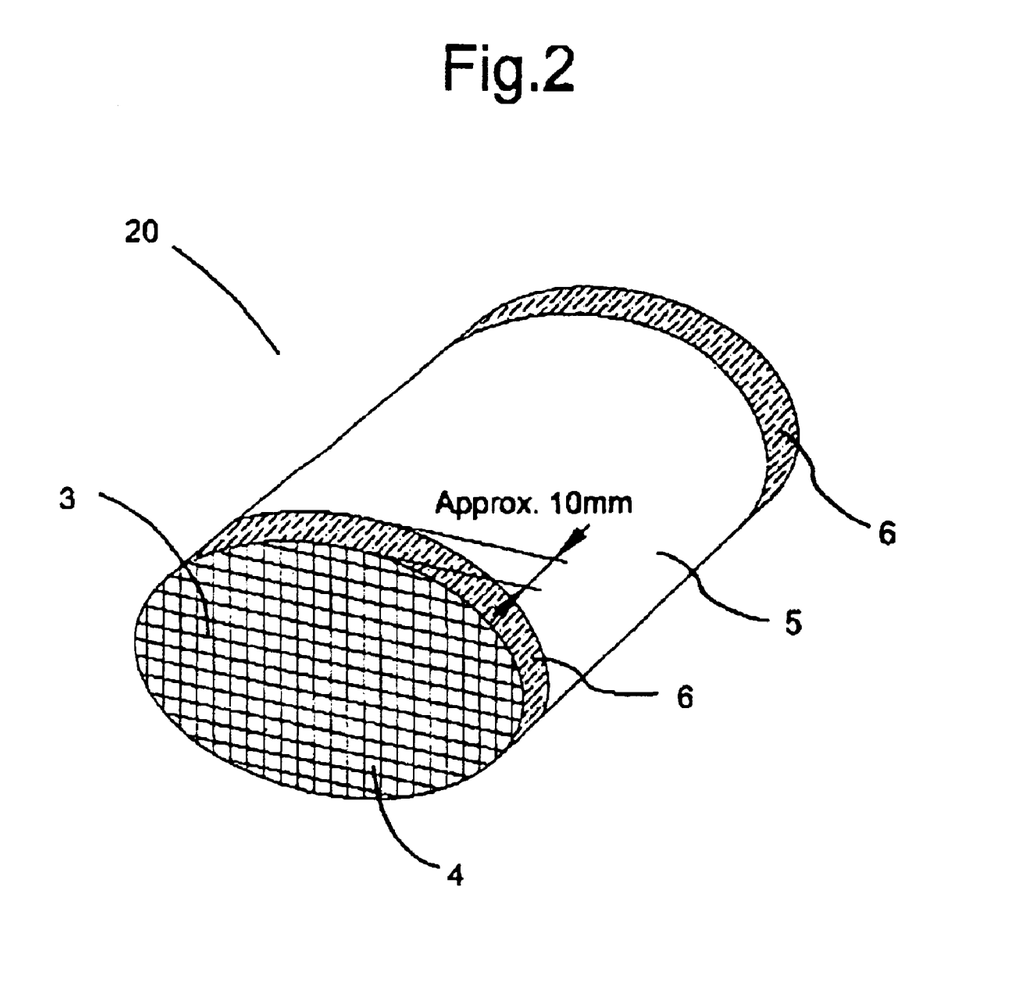
FIG. 2 is a view of the presently claimed invention according to examples 1–4.

Therefore, in Examples there was used, as an index of external pressure resistance during handling or transportation the honeycomb structure, well-known Charpy impact test to evaluate the honeycomb structures for strength against impact due to a collision with something during transportation or falling. In the Charpy impact test, a hammer is swung up and then swung down to hit the surface of the circumferential wall of the honeycomb structure. The difference between the angle of the first swinging up and the angle of rebounding shows impact rupture energy. In this test, evaluation was done by using the impact rupture energy, when the surface is ruptured, as a strength of a honeycomb structure.

honeycomb structure was impregnated with the liquid. After the surface of the circumferential wall was coated with the resin liquid to a certain degree, the honeycomb structure was taken out, and the resin liquid sticking to the circumferential wall was wiped off. The honeycomb structure was put in a drying container so as to be subjected to a thermal curing treatment at about 150° C. for 30 minutes. Thereby producing a resin reinforced honeycomb structure 20.

In Examples 3 and 4, both shown in FIG. 2, a resin 6 was applied on the circumferential wall 2. An adhesive which had been prepared by mixing a nitrile rubber with a commercially available thermosetting phenol resin was applied on the circumferential wall, thereby an adhesive layer hav-

TABLE 1

| | Method for reinforcing circumferential portion | Cell density (cpsi) | Thickness of partition wall (mm) | Thickness of circumferential wall (mm) | Impact rupture energy (kg-cm) |
|---|---|---|---|---|---|
| Comp. Ex. 1 | A ceramic was filled into 10 mm cell passages in circumferential portion, and the honeycomb structure was fired again. | 300 | 0.3 | 0.3 | 3.3 |
| Comp. Ex. 2 | The circumferential portion and 10 mm cell passages were impregnated with a ceramic, and the honeycomb structure was fired again. | | | | 3.8 |
| Comp. Ex. 3 | No reinforcement | | | | 1.5 |
| Comp. Ex. 4 | No reinforcement | 400 | 0.13 | 0.3 | 0.9 |
| Comp. Ex. 5 | No reinforcement | 400 | 0.09 | 0.25 | 0.6 |
| Comp. Ex. 6 | No reinforcement | 900 | 0.05 | 0.2 | 0.5 |
| Comp. Ex. 7 | The circumferential portion and 10 mm cell passages were impregnated with a ceramic, and the honeycomb structure was fired again. | 400 | 0.11 | 0.15 | 2.0 |
| Comp. Ex. 8 | The circumferential portion and 10 mm cell passages were impregnated with a ceramic, and the honeycomb structure was fired again. | | | 0.3 | 2.5 |
| Example 1 | The circumferential portion and 10 mm cell passages were impregnated with a resin to be cured. | | | 0.15 | 2.2 |
| Example 2 | The circumferential portion and 10 mm cell passages were impregnated with a resin to be cured. | | | 0.3 | 2.6 |
| Example 3 | An elastic resin was applied on the circumferential portion and cured. | | | 0.15 | 2.7 |
| Example 4 | An elastic resin was applied on the circumferential portion and cured. | | | 0.3 | 3.3 |
| Example 5 | A resin was filled into cells in the circumferential portion, and the resin was cured. | | | 0.15 | 2.8 |
| Example 6 | A resin was filled into cells in the circumferential portion, and the resin was cured. | | | 0.3 | 3.2 |
| Example 7 | An adhesive tape was stuck on the circumferential portion. | | | 0.15 | 2.9 |
| Example 8 | An adhesive tape was stuck on the circumferential portion. | | | 0.3 | 3.5 |
| Example 9 | An adhesive tape was stuck on the circumferential portion. | 400 | 0.09 | 0.15 | 2.1 |
| Example 10 | An adhesive tape was stuck on the circumferential portion. | | | 0.25 | 2.8 |
| Example 11 | An adhesive tape was stuck on the circumferential portion. | 600 | 0.06 | 0.15 | 2.2 |
| Example 12 | An adhesive tape was stuck on the circumferential portion. | | | 0.25 | 2.7 |
| Example 13 | An adhesive tape was stuck on the circumferential portion. | 900 | 0.05 | 0.15 | 1.9 |
| Example 14 | An adhesive tape was stuck on the circumferential portion. | | | 0.2 | 2.5 |

Table 1 shows methods for reinforcing the circumferential portions of the honeycomb structures having various structures and factors (cell density, thickness of partition walls, thickness of circumferential walls) of the shapes. The honeycomb structures were produced as examples of the present invention and comparative examples of prior art. The cordierite type honeycomb structures having a diameter of 106 mm and a length of 155 mm and having been obtained by firing an extruded and dried articles produced from kneaded material of talc, kaolin, alumina, or the like are used as respective testing samples for Examples and Comparative Examples.

FIG. 2 illustrates Examples 1 and 2, in which the surface of the circumferential wall 2 was impregnated with a resin 6. A mixture liquid having an adequately low viscosity was prepared by mixing a polyamide curing agent, a solvent, and a plasticizer with a commercially available epoxy resin. A honeycomb structure in which the entire surface of the end was masked with a tape was immersed in the liquid by approximately 10 mm from its end surfaces, leaving a band of uncoated surface 5, so that the circumferential wall of the ing a thickness of 1–2 mm and a width of approximately 10 mm from the end surfaces of the honeycomb structure was formed over the whole circumference of the circumferential wall in a narrow band. Then the honeycomb structure was subjected to heat-curing treatment at about 180° C. for 30 minutes. Thereby producing a resin reinforced honeycomb structure 20.

Figure 3:
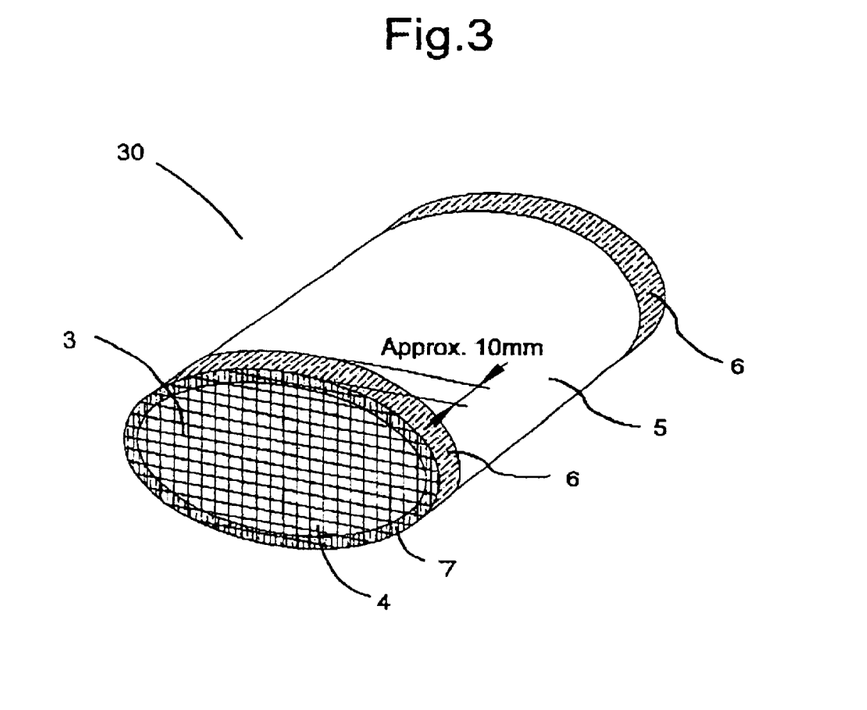
FIG. 3 is a view of the presently claimed invention according to examples 5 and 6.

FIG. 3 illustrates Examples 5 and 6, in which a resin was filled into cells in the circumferential portion. First, a mixture liquid having an adequately low viscosity was prepared by adding a polyamide curing agent, a solvent, and a plasticizer to an epoxy resin. A honeycomb structure whose end surfaces was masked with a tape so as to exclude cells in the most circumferential portion was immersed in the liquid by approximately 10 mm. After the liquid was filled into the circumferential cells 7, the honeycomb structure was taken out. The liquid sticking to the surface of the circumferential wall was wiped off. Then, the honeycomb structure was put in a drying container and subjected to a heat-curing treatment for about 150° C. for 30 minutes. Thereby producing a resin circumferential cell and surface reinforced honeycomb structure 30.

Figure 4:
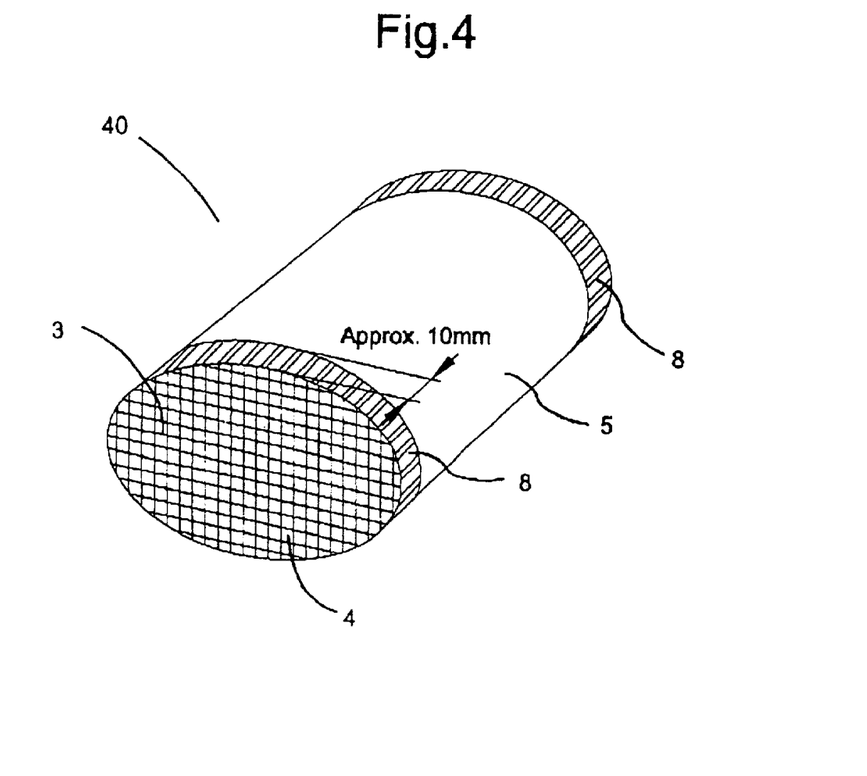
FIG. 4 is a view of the presently claimed invention according to examples 7–14.

FIG. 4 illustrates Examples 7–14, in which a tape 8 was put on the surface of the circumferential wall 2. A rubber pressure sensitive adhesive was applied on one side of a thin sheet. An adhesive tape having a thickness of 1–2 mm was cut so as to have a width of approximately 10 mm. The tape 8 was wound around the circumferential wall 2 with being pressed against the surface of the wall to cover the range within approximately 10 mm from the end of the honeycomb structure, thus leaving an uncoated surface 5. This results in a tape reinforced honeycomb structure 40.

On the contrary, honeycomb structures each having a thick partition wall was used in Comparative Examples 1–3. In Comparative Example 1, a ceramic material was filled into the cell passages in the circumferential portion, and the honeycomb structure was subjected to firing again. In Comparative Example 2, the cell walls in the circumferential portion were impregnated with a ceramic material, and the resulting honeycomb structure was subjected to firing again. In Comparative Example 3, any reinforcement was not employed. In Comparative Examples 4–6, honeycomb structures each having thin walls without any reinforcement in the circumferential portion was used. In Comparative Examples 7 and 8, honeycomb structures each having thin walls was used. The cell walls in the circumferential portion were impregnated with a ceramic material, and the resulting honeycomb structure was subjected to firing again.

The following is a summary of the reinforcement of the circumferential portions in Table 1.

Comparative Example 1

The cell passages on the circumferential portion and the circumferential wall were filled with a ceramic until the depth of approximately 10 mm from the end surface. The resultant was refired.

Comparative Example 2

A ceramic was immersed at the circumferential wall of the structure up to the distance of approximately 10 mm from the end surface. The resultant was refired.

Comparative Examples 3 to 6

No reinforcement

Comparative Examples 7 and 8

A ceramic was immersed at the circumferential wall of the structure up to the distance of approximately 10 mm from the end surface. The resultant was refired.

Examples 1 and 2

A resin was immersed at the circumferential wall of the structure up to the distance of approximately 10 mm from the end surface. The resultant was subjected to curing of the resin.

Examples 3 and 4

A resin was coated at the circumferential wall of the structure up to the distance of approximately 10 mm from the end surface. The resultant was subjected to curing of the resin.

Examples 5 and 6

The cell passages on the circumferential portion of the structure were filled with a resin until the depth of approximately 10 mm from the end surface. The resultant was subjected to curing of the resin.

Examples 7 and 14

An adhesive tape was adhered on the circumferential wall of the structure with the width of approximately 10 mm from the end surface.

The results of the test are shown in Table 1. From comparison among the results, it is found that a structural strength (impact strength in the circumferential portion) of the honeycomb structures of the Examples is about the same as that of the honeycomb structures having thick partition walls of the prior art as in Comparative Examples 1 and 2. It is further found that the honeycomb structures whose circumferential portion is reinforced according to the present invention needs particularly high rupture energy, i.e., it shows a high resistance against the rupture, in comparison with Comparative Examples 4–7 whose circumferential portions were not reinforced. The same thing is also observed when the results of the Examples are compared with Comparative Examples 8 and 9 whose circumferential portions were reinforced with a ceramic material.

As described above, according to the thin-walled honeycomb structure and the method for reinforcing the thin-walled honeycomb structure of the present invention, it becomes possible to remarkably reduce frequency of damages during handling or transportation of the honeycomb structure. This is because the honeycomb structure can be easily molded because of the small difference in thickness between the honeycomb portion and the circumferential wall, and by virtue of the reinforcement in the circumferential portion. When such a honeycomb structure is used as a carrier for an automobile exhaust gas purification catalyst, a loss in pressure is small, and heat capacity of the catalyst is reduced since the partition walls are thin. As a consequence, the present invention can improve purification ability during the period the engine has been warmed up.

What is claimed is:

1. A method for reinforcing a thin walled honeycomb structure comprising:

providing a honeycomb structure having a circumferential wall, partition walls disposed inside the circumferential wall, and cell passages defined by the partition walls; and coating the circumferential wall of the honeycomb structure with a high molecular weight organic reinforcing material in a narrow band, wherein (1) the organic reinforcing material dissipates at a high temperature, thereby protecting the edge portions of the honeycomb structure from damage before the structure is subjected to a baking treatment and (2) the coating of the circumferential wall is performed by wrapping up a circumferential portion of the honeycomb structure wholly or in a part, with a tape formed by molding said high molecular weight organic reinforcing material, within a certain distance from an extremity surface of the honeycomb structure.

2. A method for reinforcing a thin-walled honeycomb structure according to claim 1, wherein said tape is a pressure-sensitive adhesive.

3. A method for reinforcing a thin-walled honeycomb structure according to claim 1, wherein said high molecular weight organic reinforcing material is a photo-curing photo-reactive material.

4. A method for reinforcing a thin-walled honeycomb structure according to claim 2, wherein said high molecular weight organic reinforcing material is a photo-curing photo-reactive material.

5. A method for reinforcing a thin-walled honeycomb stricture according to claim 1, wherein at least the circumferential portion of the extremity surface of the honeycomb structure is reinforced with an organic high molecular material after injection molding, or after drying before firing but after injection-molding.

6. A method for reinforcing a thin-walled honeycomb structure according to claim 2, wherein at least the circumferential portion of the extremity surface of the honeycomb structure is reinforced with an organic high molecular material after injection molding, or after drying before firing but after injection-molding.

* * * * *